June 24, 1930.  H. B. OURSLER  1,767,225

NUT LOCK

Filed May 9, 1929

Inventor
H. B. Oursler,
By

Attorney

Patented June 24, 1930

1,767,225

UNITED STATES PATENT OFFICE

HOWARD B. OURSLER, OF PITTSBURGH, PENNSYLVANIA

NUT LOCK

Application filed May 9, 1929. Serial No. 361,721.

The invention relates to improvements in nut locks.

The object of the present invention is to improve the construction of nut locks and to provide a simple, practical and efficient nut lock of strong, durable, and comparatively inexpensive construction designed for holding against rotation nuts arranged in pairs and capable of being readily applied to the same after the nuts have been screwed home and of enabling the nuts to be arranged in the same plane and to abut solidly against a fish plate or other surface.

A further object of the invention is to provide a nut lock of this character which will not only be adapted for fastening the bolts located at the meeting ends of railway rails, but which will also be applicable to various types of machines and mechanical constructions employing bolts and having the nuts thereof arranged in spaced relation so as to permit the nut lock to be interposed between and engage a pair of nuts.

It is also an object of the invention to provide a nut lock of this character which may be radially disengaged from a pair of lock nuts so that should it become necessary to remove one of the bolts for replacement or other purpose it may be done without disturbing the other bolts.

With these and other objects in view, the invention consists in the construction and novel combination and arrangement of parts hereinafter described, illustrated in the accompanying drawing, and set forth in the claims hereto appended, it being understood that various changes in the form, proportion and minor details of construction, within the scope of the claims, may be resorted to without departing from the spirit of the invention or sacrificing any of the advantages thereof.

Figure 1:
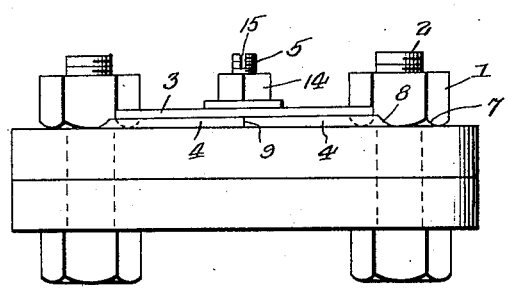
Figure 1 is a front elevation of a nut lock constructed in accordance with this invention.
Figure 4:
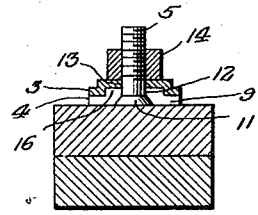
Fig. 4 is a central transverse sectional view of the same.
Figure 2:
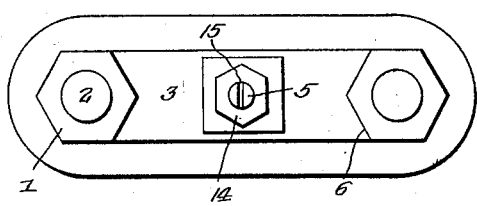
Fig. 2 is a plan view of the same.

In the accompanying drawing, in which is illustrated the preferred embodiment of the invention, the nut lock, which is designed to be interposed between and engage the nuts 1 of a pair of bolts 2, comprises in its construction a lock plate 3 and a contact plate 4 connected with the lock plate by a central bolt 5 and adapted to anchor the lock plate in its engagement with the nuts 1. The nuts are preferably hexagonal, as illustrated in the accompanying drawing, and the lock plate is provided at each end with a tapering recess 6 shaped to fit the corners of the nuts and adapted to permit a relatively fine adjustment of the nuts, which are capable of being locked in an adjustment of a sixth of a revolution, which in ordinary constructions will be found ample, but the nuts may be of any desired form, and the nut receiving recesses 6 will be shaped correspondingly to receive the corners of the nuts. The lock plate is of a length to extend between the nuts 1 and fits snugly against the same without any longitudinal or lateral play, so that the nuts will be firmly held in their adjustment and effectually prevented from being rotated through jar or vibration incident to the use of the bolts in rail joints and on various types of machines and other constructions.

Figure 5:
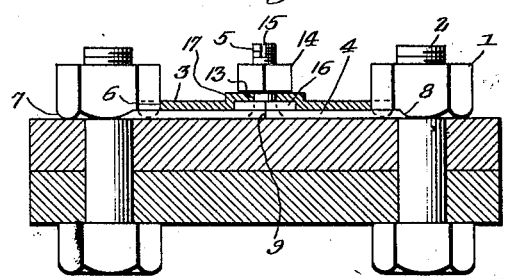
Fig. 5 is a longitudinal sectional view, the contact plate and the nuts being shown in elevation.
Figure 3:
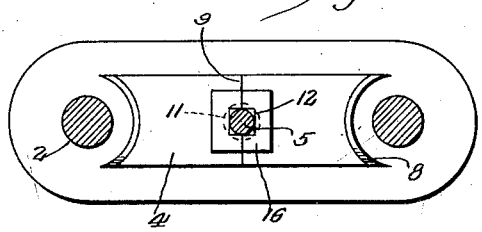
Fig. 3 is a horizontal sectional view of the nut lock.
Figure 6:
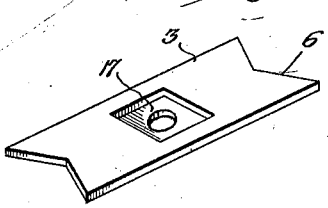
Fig. 6 is a detail perspective view of the lock plate, showing the inner face thereof.

The nuts are provided with chamfered edges 7 at their inner abutting faces, which form grooves to receive the beveled ends 8 of the contact plate, and the beveled engaging ends of the contact plate are curved to form substantially segmental recesses to fit the chamfered portions of the nuts 1, as clearly illustrated in Fig. 5 of the drawing.

Figure 7:
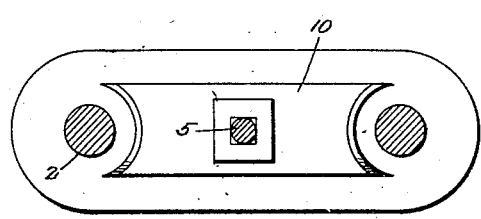
Fig. 7 is a horizontal sectional view illustrating a slightly different form of the invention, in which the contact plate is in a single piece.
Figure 7:
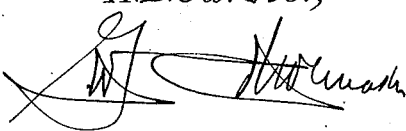

The contact plate is centrally divided at 9 to form two sections to enable it to be placed in position after the nuts 1 have been screwed home, but if desired a single piece contact plate 10 may be employed, as illustrated in Fig. 7 of the drawing. When a single piece contact plate is employed, it is placed in position after one of the nuts has been screwed home and the other nut is then applied to its bolt, thereby securing the contact plate in position. Also, with this construction it is necessary to remove one of the nuts in order to detach the contact plate. A divided contact plate, however, may be readily placed in position and removed therefrom without disturbing the nuts.

The connecting bolt 5, which centrally pierces the contact plate and the lock plate, has a head 11 countersunk in the inner face of the contact plate and suitable central openings 12 and 13 are formed in the contact plate and the lock plate for the bolt 5, which is provided with a nut 14 arranged on the threaded portion of the bolt 5 and engaging the lock plate and secured in its engagement by any suitable means, preferably by splitting the outer portion of the bolt 5 as shown at 15 and spreading slightly the sides of the split portion. This will retain the central nut in engagement with the lock plate and securely hold the latter in engagement with the nuts 1.

The contact plate and the lock plate are preferably provided with interfitting or interlocking male and female portions located at the centers of the said plates and formed by a polygonal boss 16 of the contact plate and a polygonal recess or socket 17 of the lock plate. The boss 16 and the socket 17 which receives the boss are preferably rectangular, but they may be made of any other preferred configuration. The boss, besides being interlocked with the lock plate, provides a thickened portion in which the head of the center bolt is countersunk. The socket or recess 17 may be stamped or otherwise formed in the lock plate, and the projecting portions of the sections of the divided contact plate, when such construction is employed, fitting within the socket or recess 17, form a solid, compact structure at the center of the nut lock. The nut lock may be quickly applied to and removed from the nuts of a pair of bolts, and the device will furnish absolute security in its locking action to prevent accidental rotation of the nuts.

What is claimed is:

1. A nut lock comprising a contact plate designed to be arranged between the nuts of a pair of bolts and provided at its ends with means for engaging the nuts at the inner abutting faces thereof, a lock plate fitted against the contact plate and provided at its ends with recesses engaging the adjacent portions of the nuts for holding the same against rotation, said plates being provided with interfitting male and female portions interlocking the said plates, a center bolt carried by the contact plate and piercing the lock plate and provided with a nut for engaging the same, the latter bolt being provided with means for securing its nut in engagement with the lock plate.

2. A nut lock comprising a divided contact plate designed to be interposed between the nuts of a pair of bolts and provided at its ends with open recesses for engaging the inner faces thereof, the divided contact plate and open recesses at the ends thereof permitting the said plate to be engaged with and disengaged from the nuts of the bolts without removing the said nuts, said contact plate being provided with a central projecting boss forming a male portion, a lock plate extending across the space between the said nuts and provided at its ends with recesses for engaging and holding the nuts against rotation, said lock plate being provided at its inner face with a recess forming a female portion and receiving the projecting male portion of the contact plate, and means for securing the said plates together in engaging interlocked relation.

3. A nut lock comprising a contact plate designed to be interposed between the nuts of a pair of bolts and provided at its ends with means for engaging the inner faces thereof, said contact plate being provided with a central projecting boss forming a male portion, a lock plate extending across the space between the said nuts and provided at its ends with recesses for engaging and holding the nuts against rotation, said lock plate being provided at its inner face with a recess forming a female portion and receiving the projecting male portion of the contact plate, and a center bolt countersunk in the contact plate and piercing the said male and female portions and provided with a nut engaging the lock plate, said center bolt having means for securing it in engagement with the lock plate.

4. A nut lock comprising a contact plate designed to be interposed between the nuts of a pair of bolts and provided at its ends with means for engaging the inner faces thereof, said contact plate being provided with a central projecting boss forming a male portion, a lock plate extending across the space between the said nuts and provided at its ends with recesses for engaging and holding the nuts against rotation, said lock plate being provided at its inner face with a recess forming a female portion and receiving the projecting male portion of the contact plate, and means for securing the said plates together in engaging interlocked relation, the said contact plate being centrally divided through the male and female portions to permit the nut lock to be applied after the nuts of the pair of bolts have been screwed home.

5. A nut lock comprising a contact plate designed to be interposed between the nuts of a pair of bolts and provided at its ends with means for engaging the inner faces thereof, said contact plate being provided with a central projecting boss forming a male portion, a lock plate extending across the space between the said nuts and provided at its ends with recesses for engaging and holding the nuts against rotation, said lock plate being provided at its inner face with a recess forming a female portion and receiving the projecting male portion of the contact plate, and a center bolt countersunk in the contact plate and piercing the said male and female portions and provided with a nut engaging the lock plate, said center bolt having means for securing it in engagement with the lock plate, the said contact plate being centrally divided through the male and female portions to permit the nut lock to be applied after the nuts of the pair of bolts have been screwed home.

In testimony whereof I have hereunto set my hand, this 3rd day of May, 1929.

HOWARD B. OURSLER.